(12) United States Patent
Mitterreiter

(10) Patent No.: US 6,941,240 B2
(45) Date of Patent: Sep. 6, 2005

(54) POSITION MEASURING DEVICE

(75) Inventor: Johann Mitterreiter, Chieming (DE)

(73) Assignee: Dr. Johannes Heidenhem GmbH, Traunreut (DE)

( * ) Notice: Subject to any disclaimer, the term of this patent is extended or adjusted under 35 U.S.C. 154(b) by 0 days.

(21) Appl. No.: 10/380,864

(22) PCT Filed: Sep. 11, 2001

(86) PCT No.: PCT/EP01/10472
§ 371 (c)(1),
(2), (4) Date: Mar. 17, 2003

(87) PCT Pub. No.: WO02/25218
PCT Pub. Date: Mar. 28, 2002

(65) Prior Publication Data
US 2004/0030529 A1 Feb. 12, 2004

(51) Int. Cl.$^7$ ............... G01C 17/00; G01C 19/00; G01C 9/00; G06F 15/00
(52) U.S. Cl. ............................................. 702/150
(58) Field of Search .............. 702/94, 95, 150–152, 702/158, 161; 73/179; 396/70, 238; 351/233; 359/381; 33/702, 706, 832, 1 PT

(56) References Cited

U.S. PATENT DOCUMENTS

| | | | |
|---|---|---|---|
| 2,859,084 A | | 11/1958 | Raddin |
| 3,988,748 A | * | 10/1976 | Iura et al. ............. 396/228 |
| 4,064,520 A | * | 12/1977 | Freudenschuss et al. ...... 396/70 |
| 4,170,828 A | * | 10/1979 | Ernst .................. 33/702 |
| 4,273,447 A | | 6/1981 | Nelle |
| 4,351,207 A | | 9/1982 | Werth, Jr. |
| 4,512,184 A | | 4/1985 | Ernst et al. |
| 4,663,851 A | | 5/1987 | Feichtinger |
| 4,670,750 A | | 6/1987 | Daiger et al. |
| 4,711,034 A | * | 12/1987 | Koizumi .............. 33/832 |
| 4,870,272 A | | 9/1989 | Wilson, III |
| 4,912,856 A | * | 4/1990 | Ernst ................. 33/702 |
| 6,523,268 B1 | * | 2/2003 | Boge ................ 33/1 PT |
| 2003/0172538 A1 | * | 9/2003 | Tondorf ............. 33/706 |

FOREIGN PATENT DOCUMENTS

| | | |
|---|---|---|
| DE | 28 44 066 A1 | 4/1980 |
| DE | 34 37 515 C2 | 8/1986 |
| DE | 32 28 507 C2 | 11/1986 |
| DE | 40 01 848 C1 | 5/1991 |
| DE | 41 05 434 C2 | 3/1993 |
| DE | 43 17 022 C1 | 5/1994 |
| DE | 198 03 360 A1 | 8/1998 |
| DE | 198 26 423 A1 | 12/1999 |
| DE | 198 36 003 A1 | 12/2000 |
| EP | 0 158 066 A1 | 10/1985 |
| EP | 1 099 937 A1 | 5/2001 |
| GB | 784572 | 10/1957 |

* cited by examiner

Primary Examiner—John Barlow
Assistant Examiner—Aditya Bhat
(74) Attorney, Agent, or Firm—Brinks Hofer Gilson & Lione

(57) ABSTRACT

A position measuring system that includes a scale graduation, a scanning unit for scanning the scale graduation. An adjustment device that includes a displacement element for setting a position of the scanning unit with respect to the scale graduation and a gear-down mechanism arranged between the displacement element and the scanning unit, the gear-down mechanism converts a displacement movement of the displacement element into a shorter displacement movement of the scanning unit. The gear-down mechanism includes a lever arrangement with joints, which converts the displacement movement of the displacement element into a linear displacement movement of the scanning unit in relation to the scale graduation.

15 Claims, 7 Drawing Sheets

POSITION MEASURING DEVICE

Applicant claims, under 35 U.S.C. §§ 120 and 365, the benefit of priority of the filing date of Sep. 11, 2001 of a Patent Cooperation Treaty patent application, copy attached, Ser. No. PCT/EP01/10472, filed on the aforementioned date, the entire contents of which are incorporated herein by reference, wherein Patent Cooperation Treaty patent application Ser. No. PCT/EP01/10472 was not published under PCT Article 21(2) in English.

Applicant claims, under 35 U.S.C. § 119, the benefit of priority of the filing date of Sep. 20, 2000 of a German patent application, copy attached, Ser. No. 100 46 818.7, filed on the aforementioned date, the entire contents of which are incorporated herein by reference.

BACKGROUND OF THE INVENTION

1 Field of the Invention

The present invention relates to a position measuring system.

2 Description of the Related Art

Such a position measuring system is known from DE 43 17 022 C1. The position of a scanning unit with respect to a graduated disk is adjusted by a displacement element of an adjustment device in that the displacement element in the form of a screw acts on a lever of a reduction mechanism and displaces the scanning unit in a geared-down manner. This displacement movement is a pivot movement around a flexible joint of the adjustment device.

In accordance with DE 28 44 066 A1 and DE 40 01 848 C1, the displacement also takes place by a lever which pivots the scanning unit around a flexible joint.

However, linear displacement movements of the scanning unit with respect to the scale graduation are demanded in actual use, such as has been explained in EP 0 158 066 A1, for example. For adjusting four photoelectric barriers, which are arranged spatially offset with respect to each other, of a scanning unit of an angle measuring system, the scanning unit can be displaced in the radial direction via elongated holes. There, the radial displacement is called parallel displacement and takes place by two elongated holes. However, a fine adjustment is not possible with this.

SUMMARY AND OBJECTS OF THE INVENTION

It is therefore an object of the present invention to disclose a position measuring system with an adjustment device, by which the scanning device can be linearly displaced with respect to the scale graduation in a highly accurate manner.

In accordance with the present invention, this object is attained by a position measuring system that includes a scale graduation, a scanning unit for scanning the scale graduation. An adjustment device that includes a displacement element for setting a position of the scanning unit with respect to the scale graduation and a gear-down mechanism arranged between the displacement element and the scanning unit, the gear-down mechanism converts a displacement movement of the displacement element into a shorter displacement movement of the scanning unit. The gear-down mechanism includes a lever arrangement with joints, which converts the displacement movement of the displacement element into a linear displacement movement of the scanning unit in relation to the scale graduation.

The advantage obtained by the present invention lies in that the scanning unit can be linearly displaced in a highly accurate manner by a simple device. The displacement movement of a displacement element is converted in a geared-down manner into a linear displacement movement, by which a delicate setting is made possible. Moreover, it is possible to provide a reduced structural size.

The present invention will be explained in still greater detail in what follows by exemplary embodiments. Shown are in:

DESCRIPTION OF THE PREFERRED EMBODIMENT(S) OF THE INVENTION

Figure 1:
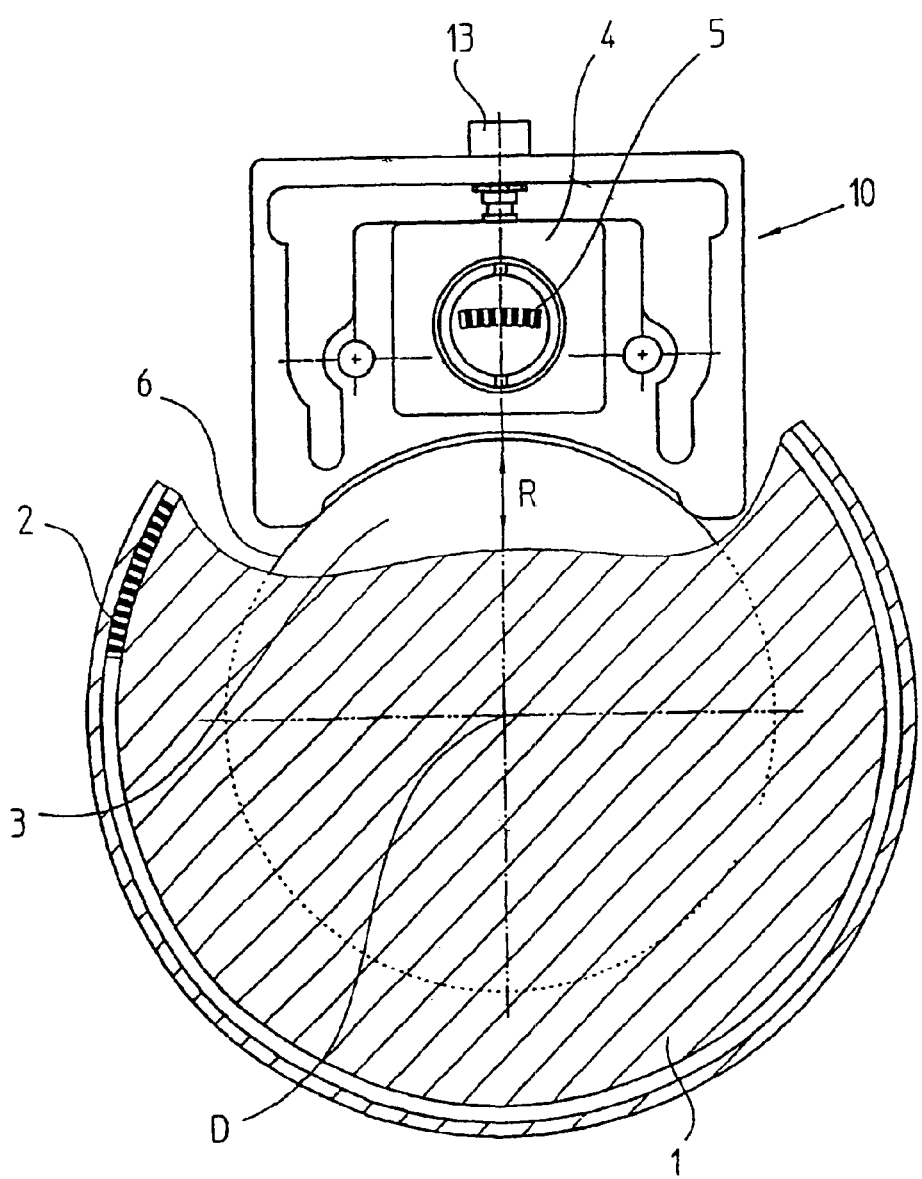
FIG. 1 shows a view from above of an embodiment of an angle measuring system with an adjustment device in accordance with the present invention.

The angle measuring system in accordance with FIG. 1 includes a graduated disk 1, which is rotatably seated around the axis of rotation D. The graduated disk has an incremental angle graduation 2 as a scale graduation, whose graduation marks are radially oriented. A scanning unit 4 is adjustably fastened on a stator 3 for measuring the rotated position of the graduated disk 1 with respect to the stator 3. The scanning unit 4 is designed in a known manner, so that only the scanning grating 5 of the scanning unit 4 is represented in FIG. 1.

The scanning unit 4 is attached to a support 16 of an adjustment device 10. The adjustment device 10 has two levers 11 and 12 with stop faces 11.10 and 12.10. These stop faces 11.10 and 12.10 are used in a known manner (DE 32 28 507 C2) for aligning the scanning unit 4 with respect to the graduated disk 1. For this purpose a centering collar 6, which extends concentrically with respect to the axis of rotation D and on which the adjustment device 10 is brought into contact with the stop faces 11.10 and 12.10, is provided on the stator 3 in which the graduated disk 1 is seated. The diameter of the centering collar 6 is subject to tolerances, so that the radial seating of the scanning unit 4 by the centering collar 6 does not always meet the demands. For compensating diameter tolerances of the centering collar 6, the scanning unit 4 must be displaced exclusively radially, without changing the alignment with respect to the axis of rotation D (direction R) linearly. This linear displacement is performed with the adjustment device 10 and will be further explained by FIG. 2.

Figure 2:
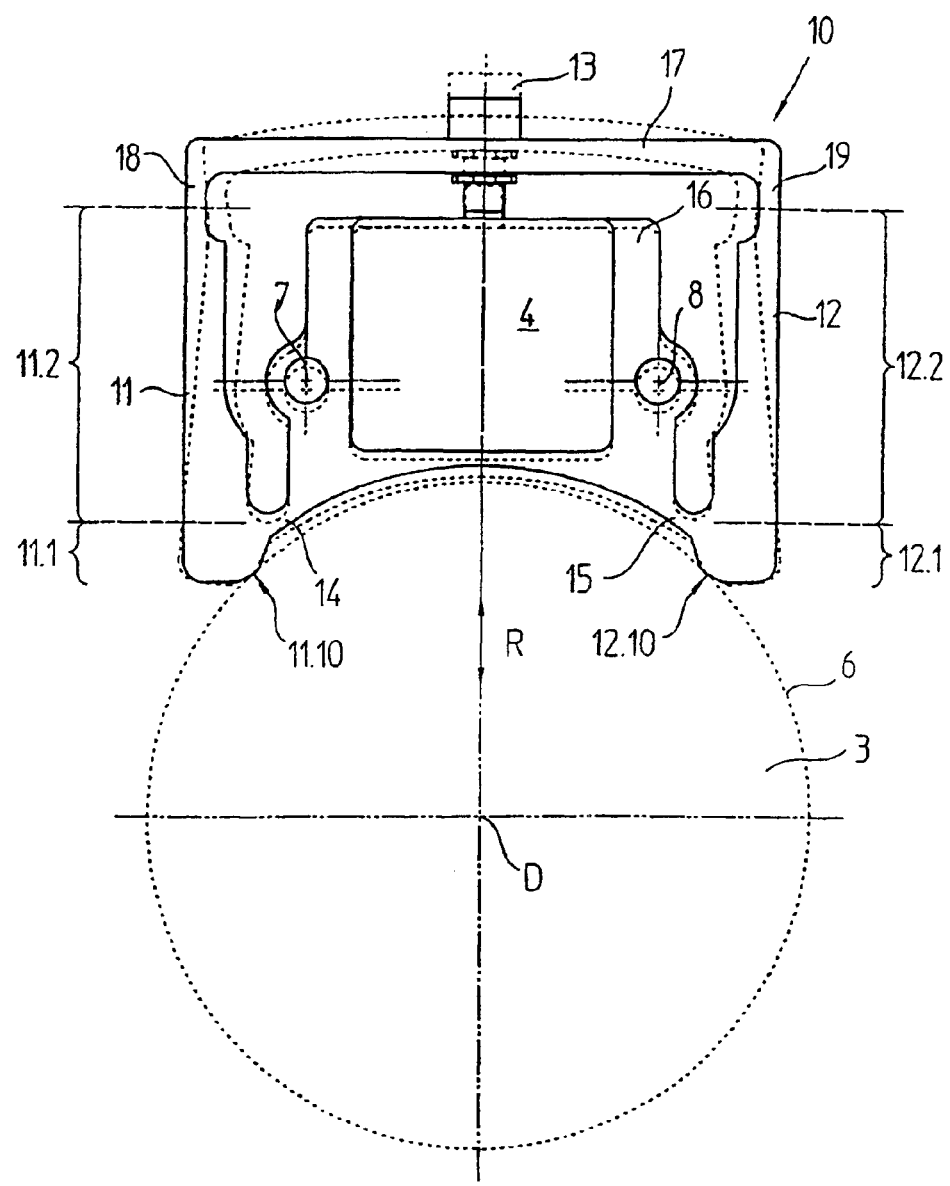
FIG. 2 shows an enlarged representation of the adjustment device in accordance with FIG. 1.

As shown on a magnified scale in FIG. 2, the adjustment device 10 includes a symmetrically constructed lever mechanism, having two levers 11, 12, each of which can be pivoted around a flexible joint 14, 15 by a common displacement element 13. The flexible joints 14, 15 are arranged between the support 16 of the scanning unit 4 and the levers 11, 12, and are embodied in the form of weakest point joints, so that the adjustment device 10 can be manufactured in one piece.

Each one of the two levers 11, 12 has a short lever arm 11.1, 12.1 and a longer lever arm 11.2, 12.2, extending from the flexible joint 14, 15. The common displacement element 13, with which the two longer lever arms 11.2, 12.2 are pivoted in opposite directions around the flexible joints 14, 15, acts on the two longer lever arms 11.2, 12.2. The stop faces 11.10, 12.10 are formed on the shorter lever arms 11.1, 12.1. The movement of the displacement element 13 is converted by the two lever arms 11, 12 in a geared-down manner into an oppositely directed movement of the two stop faces 11.10, 12.10. Since the two stop faces 11.10, 12.10 are kept in contact with the centering collar 6, the support 16, and therefore the scanning unit 4, moves linearly in the radial direction R when the displacement element 13 is actuated.

It is particularly advantageous if the two lever arms 11.2, 12.2 are connected with each other via a common yoke 17, on which the displacement element 13 acts. The yoke 17 connects the two long lever arms 11.2, 12.2 in one piece with each other and is designed as a flexible beam, or deformation member. The displacement element in the form of a screw 13 acts against the center of the yoke 17 and bends the yoke 17 in the radial direction R. In the process the screw 13 is supported on the support 16. The deformation of the yoke 17 causes a shortening of the yoke 17, and thus the pivoting of the two levers 11 and 12 over respectively identical distances in opposite directions. To introduce the pivot movement into the levers 11, 12, it is advantageous if a flexible joint 18, 19 is respectively arranged between the yoke 17 and the longer lever arms 11.2 and 12.2.

Once the radial position of the scanning unit 4 has been correctly set by the adjustment device 10 with the gear-down mechanism includes the levers 11,12 and the flexible joints 14, 15, it is fixed in place on the stator 3 by a fastening mechanism, not represented. The fastening bores 7, 8 provided for this are schematically represented in FIG. 2.

A displacement of the scanning unit 4 transversely to the radial direction R is also possible by the adjustment device 10. A further displacement element 9 is provided for this purpose, which acts on one of the two longer lever arms 11.2, 12.2 and deflects it transversely with respect to the radial direction R. This exemplary embodiment in FIG. 3.

Figure 3:
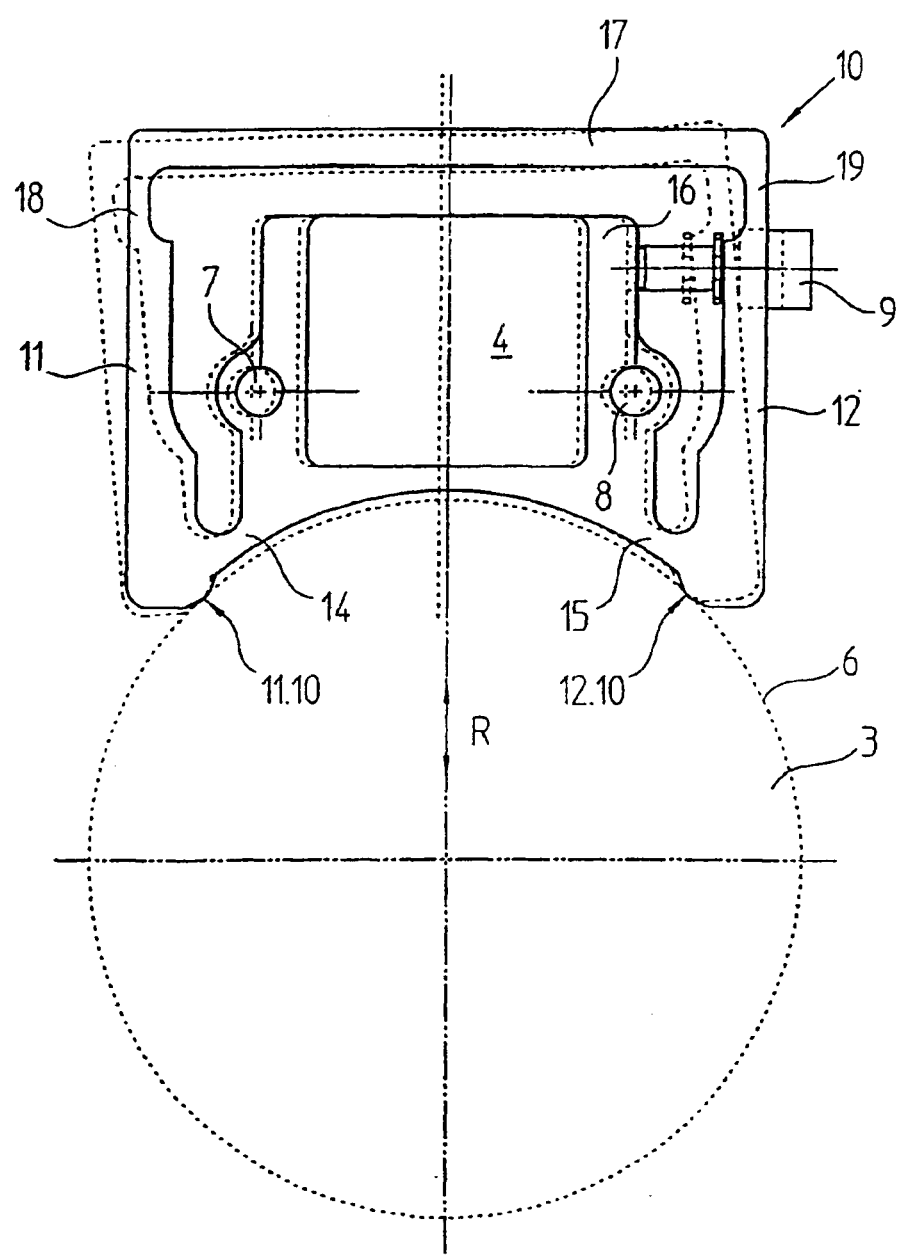
FIG. 3 shows the adjustment device of FIG. 1 in a further adjusting position.

In FIGS. 2 and 3 the levers 11, 12 are shown by solid lines in the non-deflected position, and by dashed lines in the deflected position, i.e. the adjusted position.

Figure 4:
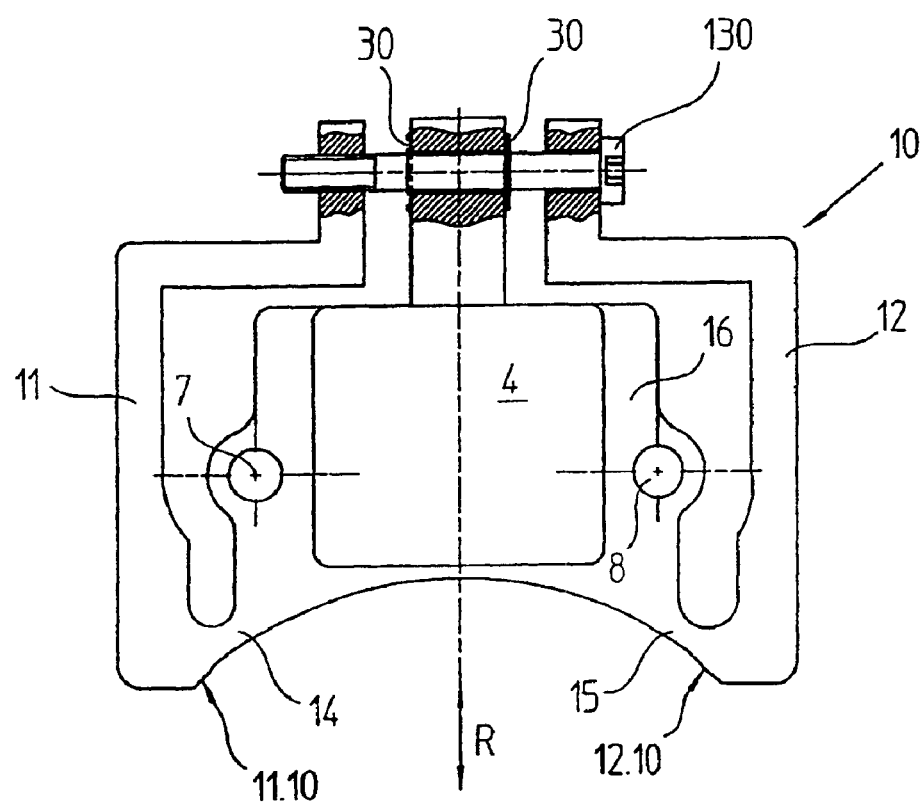
FIG. 4 shows a second embodiment of an adjustment device in accordance with the present invention.

Alternatively to the yoke 17 in the form of a deformation member, the coupling of the two levers 11, 12 can be performed by a displacement element 130 in accordance with FIG. 4. For the pivoting of the two levers 11, 12, they are connected with each other by the screw 130. When turning the screw 130, the two levers 11, 12 move in opposite directions over identical distances.

If only one of the levers 11, 12 is to be pivoted, the screw 130 must be supported on a portion of the stator 3 (stator 3 represented in FIG. 3), or on the support 16, which is indicated by the locking ring 30.

In a manner not represented, instead of a screw, the displacement element 13 in accordance with FIG. 3 can also be an eccentric, whose eccentric surface is in contact with the yoke 17 for bending the latter or, for deflecting only one lever 11, 12, it can be in contact with the latter. In the exemplary embodiment in accordance with FIG. 4, the oppositely directed displacement of the two levers 11, 12 can also be provied by a wedge which acts simultaneously on the two levers 11, 12.

In connection with the exemplary embodiments so far explained, in the course of adjustment it is necessary to advance the entire adjustment device 10 with the scanning unit 4 on the centering collar 6. In the exemplary embodiment explained in what follows, the adjustment device 10 can be rigidly fixed in place on the stator 3 by a stationary element 20, and the scanning unit 4 can be set in relation to this stationary fixed element 20 of the adjustment device 10. For this purpose, the adjustment device 10 is aligned on the centering collar 6 by the stop faces 11.10, 12.10 and is fixed in place. The fastening bores 27 and 28 are provided for fixing the stator 3 in place.

The gear-down mechanism shown in FIGS. 5 and 6 again includes a laterally-reversed lever arrangement with two levers 11, 12, which can be pivoted in opposite directions by a displacement element 13. The levers 11, 12 are hinged on the stationary element 20 via flexible joints 14, 15, and are connected with each other by means of a common yoke 17. The yoke 17 again is a deformation member, on whose center the displacement 13 acts. With a centered bending of the deformation member, the common connection between the two levers 11, 12 is shortened, which results in a deflection of the two levers 11, 12 over identical distances in opposite directions. In this case the displacement element 13 can be supported on the stator 3 or, in accordance with FIG. 6, on the support 16.

The support 16 of the scanning unit 4 can be displaced via a gear-down mechanism in the radial direction R with respect to the stationary element 20, analogous to the already explained exemplary embodiments. Parts with the same function are provided with the same reference numerals in all exemplary embodiments.

The pivot movement of the two levers 11, 12 is transmitted in a geared-down manner to the support 16 with the scanning unit 4. The pivot movement performed by the long lever arm 11.2, 12.1 is passed on to the shorter lever arm 11.1, 12.1. The further transfer takes place by respective guide rods 21, 22 in the form of a pushrod, one end of which is fastened on the short lever arm 11.1, 12.1, and the other end on the support 16. The one end of each guide rod 21,22 is fastened via a flexible joint 23, 24 on the short lever arm 11.1, 12.1, and the other end via a further flexible joint 25, 26 on the support 16. The guide rods 21, 22 convert the pivot movement of the two levers 11, 12 into a linear displacement movement of the support 16 exclusively in the radial direction R. In this way the scanning unit 4 is coupled via the two fastening points in the form of flexible joints 25, 26 with the lever arrangement 11, 12 and the guide rods 21, 22. By the guide rods 21, 22 the pivot movement of the levers 11, 12 is converted into a parallel displacement of the two fastening points.

Figure 5:
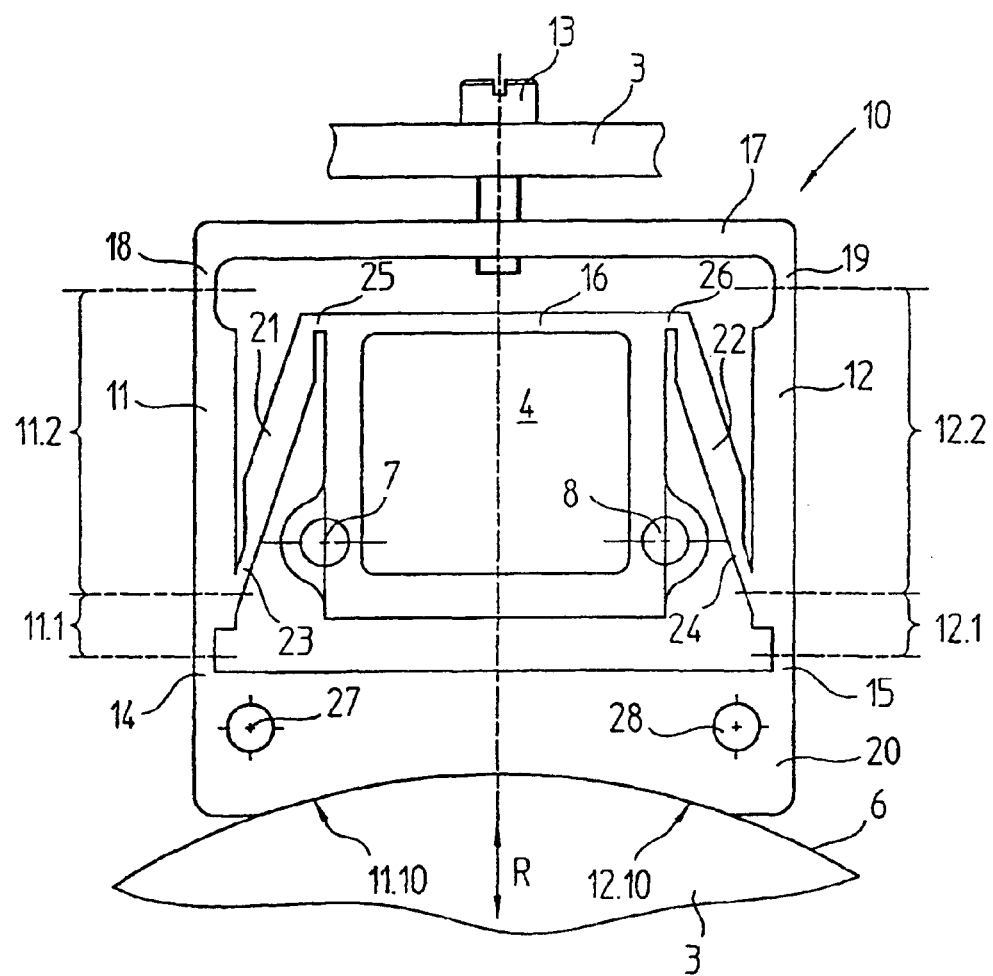
FIG. 5 shows a third embodiment of an adjustment device in accordance with the present invention.
Figure 6:
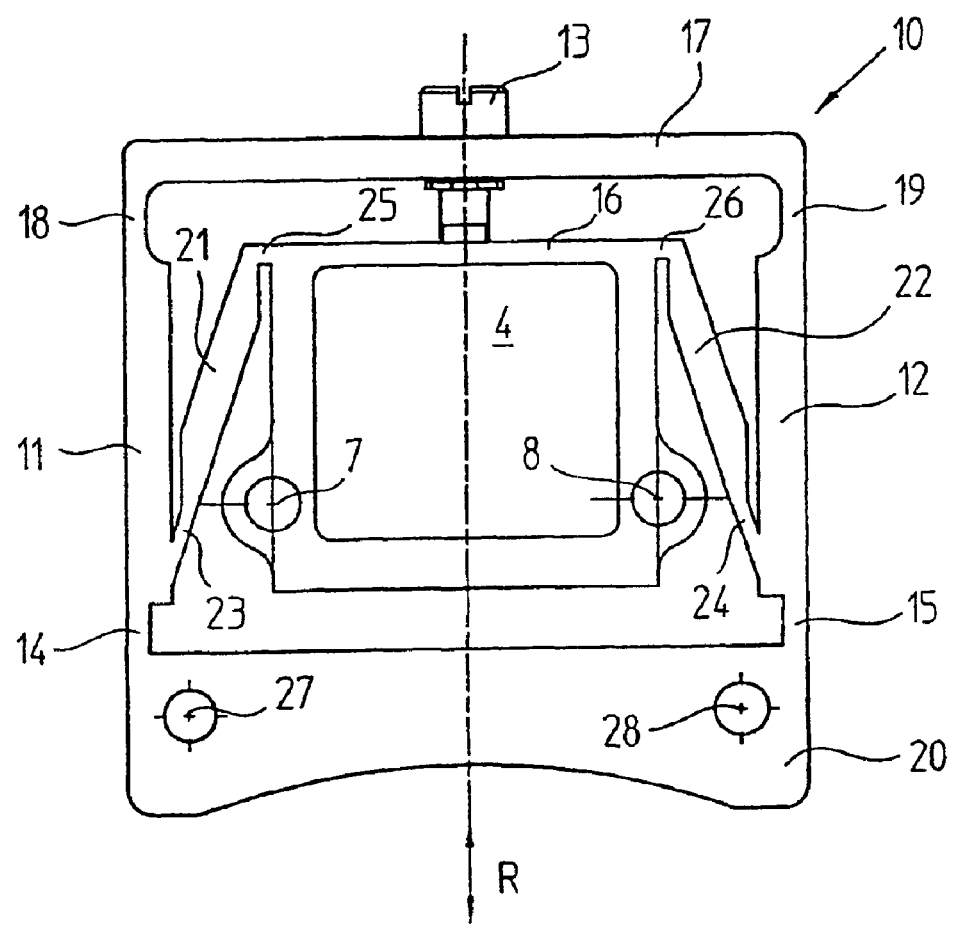
FIG. 6 shows a fourth embodiment of an adjustment device in accordance with the present invention.

The adjustment devices in accordance with FIGS. 5 and 6 additionally permit an adjustment of the scanning unit in a direction transversely to the radial direction R in that—as represented in FIG. 3—a further displacement element 9 only acts on one of the two levers 11, 12.

After an adjustment has been performed, the scanning unit 4 is fixed in place on the stator 3. Fastening bores 7, 8 are provided for this purpose on the support 16.

Figure 7:
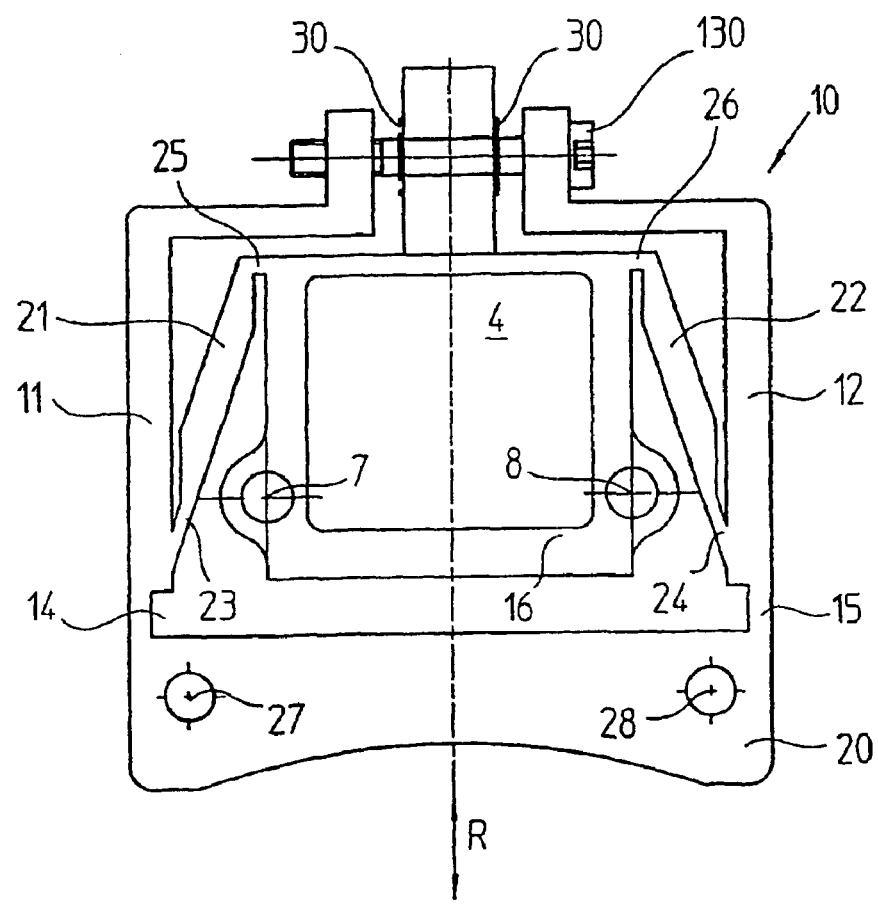
FIG. 7 shows a fifth embodiment of an adjustment device in accordance with the present invention.

Analogously with the exemplary embodiment of FIG. 4, the two levers 11, 12 can also be connected with each other by a common screw 130, as represented in FIG. 7.

The device in accordance with the present invention can also be employed for adjusting the scanning unit in other straight-line movement directions, for example for setting the scanning distance between the graduation 2 and the scanning grating 5. Moreover, the present invention is not limited to the described angle measuring system. In place of a graduated disk 1, the scale graduation can be merely a sector, or a linear scale. The scale graduation can be designed to be scanned photoelectrically, capacitively, magnetically or inductively. The graduation can be an incremental periodic graduation or an absolute single-track or multi-track coding.

The invention may be embodied in other forms than those specifically disclosed herein without departing from its spirit or essential characteristics. The described embodiments are to be considered in all respects only as illustrative and not restrictive, and the scope of the invention is commensurate with the appended claims rather than the foregoing description.

I claim:

1. A position measuring system, comprising:
   a scale graduation;
   a scanning unit for scanning said scale graduation;
   an adjustment device comprising:
   a displacement element that interacts with said scanning unit so as to set a position of said scanning unit with respect to said scale graduation; and
   a gear-down mechanism arranged between said displacement element and said scanning unit, said gear-down mechanism converts a displacement movement of said displacement element into a shorter displacement movement of said scanning unit, wherein said gear-down mechanism comprises a lever arrangement with joints, which converts said displacement movement of said displacement element into a linear displacement movement of said scanning unit in relation to said scale graduation.

2. The position measuring system in accordance with claim 1, wherein said displacement element acts simultaneously on two levers, and each of said two levers is seated so that it is pivotable around a flexible joint.

3. A position measuring system comprising:
   a scale graduation;
   a scanning unit for scanning said scale graduation;
   an adjustment device comprising:
   a displacement element for setting a position of said scanning unit with respect to said scale graduation, wherein said displacement element acts simultaneously on two levers, and each of said two levers is seated so that it is pivotable around a flexible joint, wherein said two levers are coupled together by a yoke, on which said displacement element acts, wherein said two levers are pivoted in opposite directions when said displacement element is actuated; and
   a gear-down mechanism arranged between said displacement element and said scanning unit, said gear-down mechanism converts a displacement movement of said displacement element into a shorter displacement movement of said scanning unit, wherein said gear-down mechanism comprises a lever arrangement with joints, which converts said displacement movement of said displacement element into a linear displacement movement of said scanning unit in relation to said scale graduation.

4. The position measuring system in accordance with claim 3, wherein said yoke is a deformation member, which is formed in one piece on said two levers.

5. A position measuring system, comprising:
   a scale graduation;
   a scanning unit for scanning said scale graduation;
   an adjustment device comprising:
   a displacement element for setting a position of said scanning unit with respect to said scale graduation;
   a gear-down mechanism arranged between said displacement element and said scanning unit, said gear-down mechanism converts a displacement movement of said displacement element into a shorter displacement movement of said scanning unit, wherein said gear-down mechanism comprises a lever arrangement with joints, which converts said displacement movement of said displacement element into a linear displacement movement of said scanning unit in relation to said scale graduation; and
   stop faces spaced apart from each other, by which said scanning unit is oriented with respect to said scale graduation, and said stop faces are displaced over said lever arrangement by a common displacement element.

6. The position measuring system in accordance with claim 5, wherein said scale graduation comprises an angle graduation, which is seated in a stator and is rotated around an axis of rotation, and a centering collar, which extends concentrically with respect to said axis of rotation, is arranged on said stator, against which said adjustment device rests by two stop faces, and said lever arrangement for displacing said two stop faces is arranged between said displacement element and said two stop faces.

7. The position measuring system in accordance with claim 6, wherein said lever arrangement comprises two levers, each of which can be pivoted in opposite directions around a respective flexible joint, wherein a flexible joint of one of said two levers is arranged between said scanning unit and one of said two levers.

8. The position measuring system in accordance with claim 7, wherein each one of said two levers comprises:
   a short lever arm extending from a respective flexible joint; and
   a longer lever arm extending from said respective flexible joint, wherein said displacement element acts on said longer lever arm, and one of said two stop faces is arranged on said shorter lever arm.

9. The position measuring system in accordance with claim 8, wherein said adjustment device comprises a stationary element, to which said scanning device is coupled by flexible joints, and said flexible joints are displaced parallel to each other on said scanning unit by said lever arrangement.

10. The position measuring system in accordance with claim 9, wherein said lever arrangement comprises two levers, wherewith respectively one of said two levers acts on one of said flexible joints of said scanning unit, and said two levers are pivoted together via said displacement element.

11. The position measuring system in accordance with claim 10, wherein said two levers are coupled to a guide rod, which converts pivot movement of said two levers into a parallel movement of said flexible joints of said scanning unit.

12. The position measuring system in accordance with claim 11, wherein said guide rod is coupled to said scanning unit by one of said flexible joint, and said flexible joint is coupled to one of said two levers by a further flexible joint.

13. A position measuring system, comprising:
   a scale graduation;
   a scanning unit for scanning said scale graduation, wherein said scanning unit generates a signal representative of a position of said scale graduation that is scanned by said scanning unit;
   an adjustment device comprising:
   a displacement element for setting a position of said scanning unit with respect to said scale graduation; and a near-down mechanism arranged between said displacement element and said scanning unit, said gear-down mechanism converts a displacement movement of said displacement element into a shorter displacement movement of said scanning unit, wherein said gear-down mechanism comprises a lever arrangement with joints, which converts said displacement movement of said displacement element into a linear displacement movement of said scanning unit in relation to said scale graduation.

14. A position measuring system, comprising:

a scale graduation, a scanning unit for scanning said scale graduation, wherein said scanning unit generates a signal representative of a position of said scale graduation that is scanned by said scanning unit;

an adjustment device comprising:

a displacement element for setting a position of said scanning unit with respect to said scale graduation, wherein said displacement element acts simultaneously on two levers, and each of said two levers is seated so that it is pivotable around a flexible joint; and a gear-down mechanism arranged between said displacement element and said scanning unit, said gear-down mechanism converts a displacement movement of said displacement element into a shorter displacement movement of said scanning unit, wherein said gear-down mechanism comprises a lever arrangement with joints, which converts said displacement movement of said displacement element into a linear displacement movement of said scanning unit in relation to said scale graduation.

15. The position measuring system in accordance with claim 5, wherein said scanning unit generates a signal representative of a position of said scale graduation that is scanned by said scanning unit.

* * * * *

UNITED STATES PATENT AND TRADEMARK OFFICE
CERTIFICATE OF CORRECTION

PATENT NO. : 6,941,240 B2  Page 1 of 1
APPLICATION NO. : 10/380864
DATED : September 6, 2005
INVENTOR(S) : Johann Mitterreiter It is certified that error appears in the above-identified patent and that said Letters Patent is hereby corrected as shown below:

Column 7, in claim 13, line 1, before "mechanism arranged" delete "near-down" and substitute --gear-down-- in its place.

Signed and Sealed this

Twenty-first Day of November, 2006

JON W. DUDAS
*Director of the United States Patent and Trademark Office*